United States Patent
Wang et al.

(10) Patent No.: US 6,561,671 B2
(45) Date of Patent: May 13, 2003

(54) CASE WITH VIBRATION-ACTIVATED LIGHT EMITTING INDICATION APPARATUS

(75) Inventors: Shaw-Jong Wang, Hsinchu (TW); Joseph Shen, Taipei (TW); Chien-Hua Wu, Miao Li Hsien (TW); Charen Yu, Taipei (TW)

(73) Assignee: Ritek Corporation, Taiwan (CN)

( * ) Notice: Subject to any disclaimer, the term of this patent is extended or adjusted under 35 U.S.C. 154(b) by 0 days.

(21) Appl. No.: 09/864,151

(22) Filed: May 25, 2001

(65) Prior Publication Data

US 2002/0085375 A1 Jul. 4, 2002

(30) Foreign Application Priority Data

Dec. 29, 2000 (TW) .................................... 89222763 U

(51) Int. Cl.[7] ............................................... F21V 33/00
(52) U.S. Cl. ...................... 362/154; 362/84; 362/155; 362/276; 362/802
(58) Field of Search .......................... 362/84, 86, 154, 362/155, 156, 276, 802

(56) References Cited

U.S. PATENT DOCUMENTS 5,833,508 A * 11/1998 Chien ........................ 445/24
5,836,671 A * 11/1998 Chien ........................ 362/103
6,082,867 A * 7/2000 Chien ........................ 313/512
6,271,631 B1 * 8/2001 Burrows ..................... 313/511

* cited by examiner

Primary Examiner—Sandra O'Shea
Assistant Examiner—Guiyoung Lee
(74) Attorney, Agent, or Firm—Finnegan, Henderson, Farabow, Garrett & Dunner, L.L.P.

(57) ABSTRACT

The present invention discloses a case with a vibration-activated light emitting indication apparatus comprising a case and a light emitting indication apparatus. The light emitting indication apparatus includes an indicator plate, which is transparent and contains a pattern, including, for example, a logo, characters, and drawings; an electroluminescent laminate; a power supply, which powers the electroluminescent laminate; a vibration sensor IC, which senses the vibration caused by an external act of pressing or shaking on the case, and then controls an inverter to activate the electroluminescent laminate. The above-mentioned case can be a container with a cover, such as a DVD case, a watch box, a jewelry box and any other cases. The pattern on the transparent indicator plate can be highlighted by the light emitted from the electroluminescent laminate, achieving a vivid image such that the case is elaborately ornamented.

10 Claims, 2 Drawing Sheets

CASE WITH VIBRATION-ACTIVATED LIGHT EMITTING INDICATION APPARATUS

BACKGROUND OF THE INVENTION

1. Field of the Invention

The present invention relates to a case with a light emitting indication apparatus, and in particular, to a vibration-activated indication apparatus, which is that located on the surfaces of packages or any kind of cases and emits light when touched or shaken by a user.

2. Description of Prior Art

Currently, the cases for containing goods can just be beautified with a logo or a figure on their surfaces or shape. Such superficial beautification of the surface and shape of the case turns out not quite attractive.

Moreover, as logo or advertisement on the surface of case for goods is dull, it is very difficult to make a strong impression on the consumers and attract them to purchase the goods. By combining technology of electroluminescent laminate with image and sound effects to lively show logo, pattern and character on a flat plane, the cases for goods can not only become vivid but also stimulate the customers' will to purchase the goods. Thus, the brand of the goods is very impressive and gains a better reputation.

SUMMARY OF THE INVENTION

An object of the present invention is to provide a case with a vibration-activated light emitting indication apparatus, which can be activated by vibrations caused by external pressing or shaking to the case and then shows the patterns on an indicator plate.

A further object of the present invention is to provide a case with a vibration-activated light emitting indication apparatus that can enhance sound and image effects of the decorated patterns on the surface of a package or any kind of cases.

To achieve the above purposes, the case with a vibration-activated light emitting indication apparatus of the present invention, comprises a case having a cover and a container; a vibration-activated light emitting indication apparatus, which is mounted on a surface of the case, including; an indicator plate, which is transparent and has a pattern; a power supply; an electroluminescent laminate, which is situated beneath the indicator plate and can emit a light as powered by the power supply; and a control unit, connected to the power supply and the electroluminescent laminate, wherein the control unit connects the power supply to the electroluminescent laminate when it senses the vibrations of the case.

The apparatus described above can be mounted on any kind of cases, such as a DVD case, a bag, a jewelry box, a toy box, etc. According to the present invention, a vibration sensor IC activates the electroluminescent laminate by sensing the external environment. The light emitted from the electroluminescent laminate passes through the transparent indicator plate, highlighting the pattern on the indicator plate. Thus, the goods are elaborately beautified.

BRIEF DESCRIPTION OF THE FIGURES

The present invention will be described in accordance with the accompanying figures, wherein.

DETAILED DESCRIPTION OF THE PREFERRED EMBODIMENTS

Figure 1:
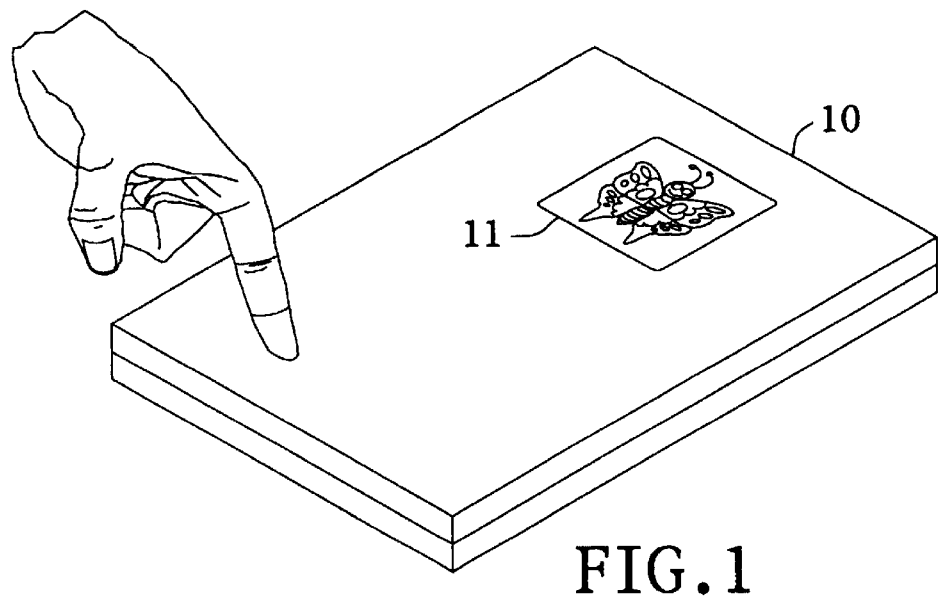
FIG. 1 is a first embodiment of a case with a vibration-activated light emitting indication apparatus of the present invention.

FIG. 1 shows the first embodiment of the case with a vibration-activated light emitting indication apparatus in accordance with the present invention. As shown in FIG. 1, the indication apparatus of the present invention is located on a surface of a DVD case 10, and it can be activated by the vibration caused by external act of pressing or shaking on the DVD case 10. On the surface of the DVD case 10, the pattern on an indicator plate 11 can be highlighted by a light that is emitted from an electroluminescent laminate. The indicator plate 11 may be made out of a transparent material with patterns intended to be shown thereon. The present invention can also have a variety of the indicator plates changing the light emitting essences of electroluminescent laminate, such as single flicking, multiple flicking, flicking frequency, different colors, and so on.

Figure 2:
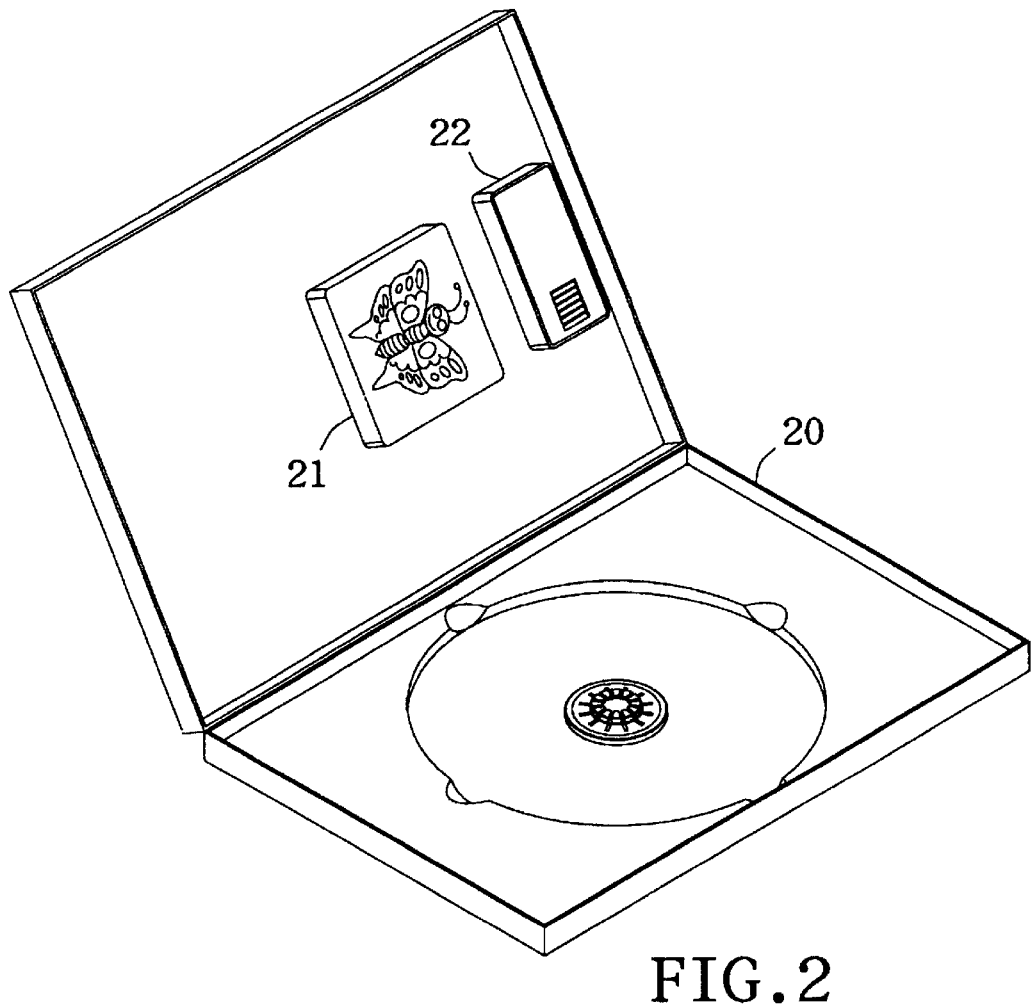
FIG. 2 is a second embodiment of a case with a vibration-activated light emitting indication apparatus of the present invention.

FIG. 2 shows a second embodiment of the case with a vibration-activated light emitting indication apparatus in accordance with the present invention. An indicator plate 21 is mounted on any surfaces on a DVD case 20, if desired.

As shown in FIG. 2, a vibration sensor IC and a power supply 22 are always placed inside the box 20. A converter in the vibration sensor IC is to control the electroluminescent laminate 31. The vibration sensor IC can sense the vibration of the box 20 caused by external act of pressing or shaking and thereby activates the electroluminescent laminate 31. According to another embodiment, a music IC can also be connected to the vibration sensor IC so that the box 20 can further sound a music in addition to the vivid image formed by the electroluminescent laminates 31. The power supply 22 is provided with D.C. batteries to supply power to the apparatus.

Figure 3:
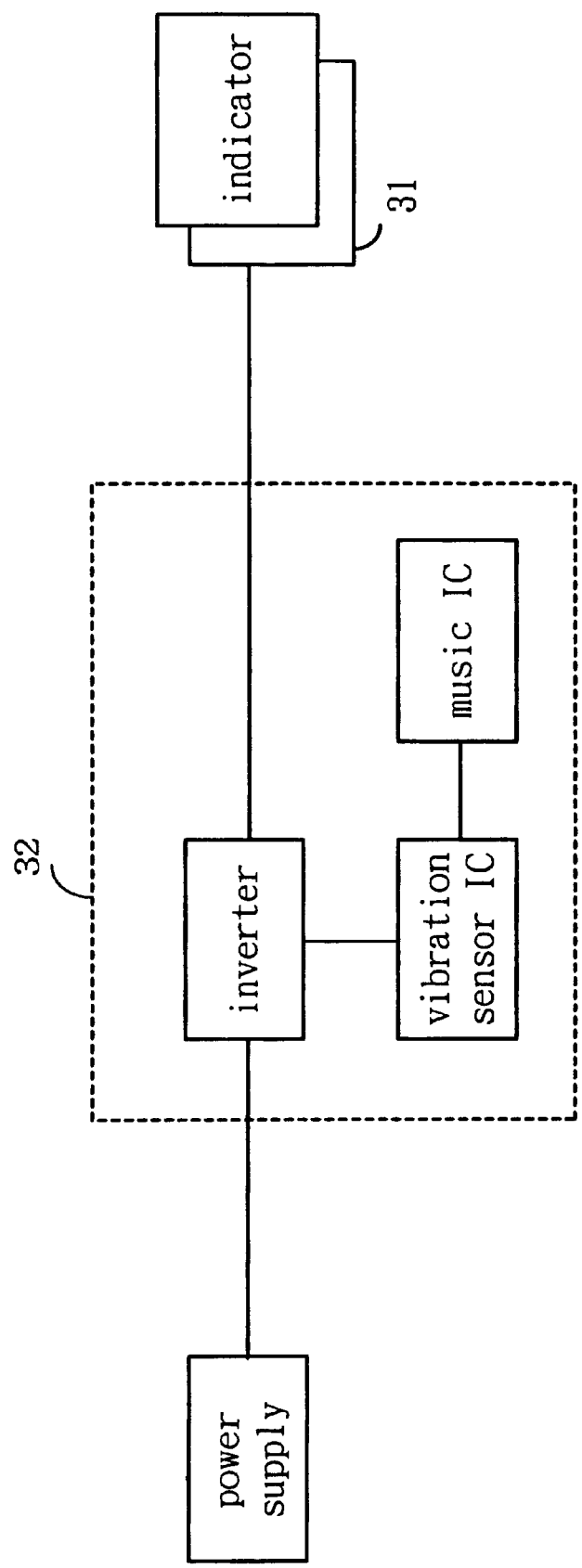
FIG. 3 is a block diagram of a case with a vibration-activated light emitting indication apparatus of the present invention.

FIG. 3 is a block diagram of the case with a vibration-activated light emitting indication apparatus of the present invention. A power supply, which includes a driving circuit and batteries, can power to electrodes of electroluminescent laminate to emit a light. Moreover, the power supply may be designed for several different power supply modes, such as consecutive power supply or intermittent power supply, to obtain different effects, such as flicking of the indicator plate.

The control unit 32 contains a vibration sensor IC and an inverter which is used as a switch to activate the electroluminescent laminate 31. After sensing vibration caused by external act of vibration of the case, the inverted switches to an "on" state to activate the electroluminescent laminate 31. If a musical effect is needed, the music IC can be connected to control the musical effect when the vibration sensor IC is activated. After plural clock pulses after the electroluminescent laminate is activated, the control unit 32 disconnects the power supply from the electroluminescent laminate 31.

The electroluminescent laminate 31 essentially consists of a lamination of a transparent substrate, a transparent electrode layer, a fluorescent layer, and a back electrode layer. When the transparent electrode layer and the back electrode layer are biased by a potential, the fluorescent layer emits a light and the light will pass through the transparent substrate. The electroluminescent laminate may be designed in accordance with the need of the indicator plate. For example, the transparent substrate may be a multicolored layer to enrich the color effect.

Given the above, the case with a vibration-activated light emitting apparatus can be obtained by combining a power supply and a main structure, which includes the case, the indicator plate, the vibration sensor IC, the electroluminescent laminate, and the inverter. The case can be a package for a variety of goods, such as a DVD case, a watch case, a jewelry box, and a stationery case. Furthermore, the indicator plate can be mounted on any arbitrary surfaces of the case, such as the inside or the outside of the case. The image effect may be exhibited together with a musical effect. Also, the consecutive multicolored flicking of the electroluminescent laminate may further highlight the patterns of animals or cartoon, logos, characters or any other features intended to be shown. The variety of changes derived from similar ideas is included in the present invention.

Although the present invention has been disclosed in terms of preferred embodiments, the disclosure is not intended to limit the present invention. The present invention still can be modified, varied by persons skilled in the art without departing firm the scope and spirit of the present invention which are determined by the claims below.

What is claimed is:

1. A case with a vibration-activated light emitting indication apparatus, comprising,
    a case having a cover and a container; and
    a vibration-activated light emitting indication apparatus mounted on the cover of the case, including;
        (a) art indicator plate, which is transparent and has a pattern;
        (b) a power supply;
        (c) an electroluminescent laminate situated beneath the indicator plate and being capable of emitting a light as powered by the power supply; and
        (d) a control unit for connecting the power supply to the electroluminescent laminate when a vibration of the case is sensed.

2. The case according to claim 1, wherein the electroluminescent laminate is a laminate of single color or multi color.

3. The case according to claim 1, wherein the electroluminescent laminate emits the light continuously or emits the light intermittently.

4. The case according to claim 1, wherein the control unit further comprises a vibration sensor IC and an inverter.

5. The case according to claim 1, wherein the control unit further comprises a music IC to produce music.

6. The case according to claim 1, wherein the power supply is a battery.

7. The case according to claim 1, wherein a predetermine number of clock pulses after the electroluminescent laminate emits the light, the control unit disconnects the power supply from the electroluminescent laminate.

8. The case according to claim 1, wherein the pattern is a logo.

9. The case according to claim 1, wherein the pattern is a pattern of at least one of an animal or a cartoon character.

10. The apparatus according to claim 1, wherein the case is a DVD case or CD case.

* * * * *